Dec. 19, 1933.   L. H. BLOOD   1,940,443
MILLING MACHINE
Filed Jan. 15, 1931      5 Sheets-Sheet 1
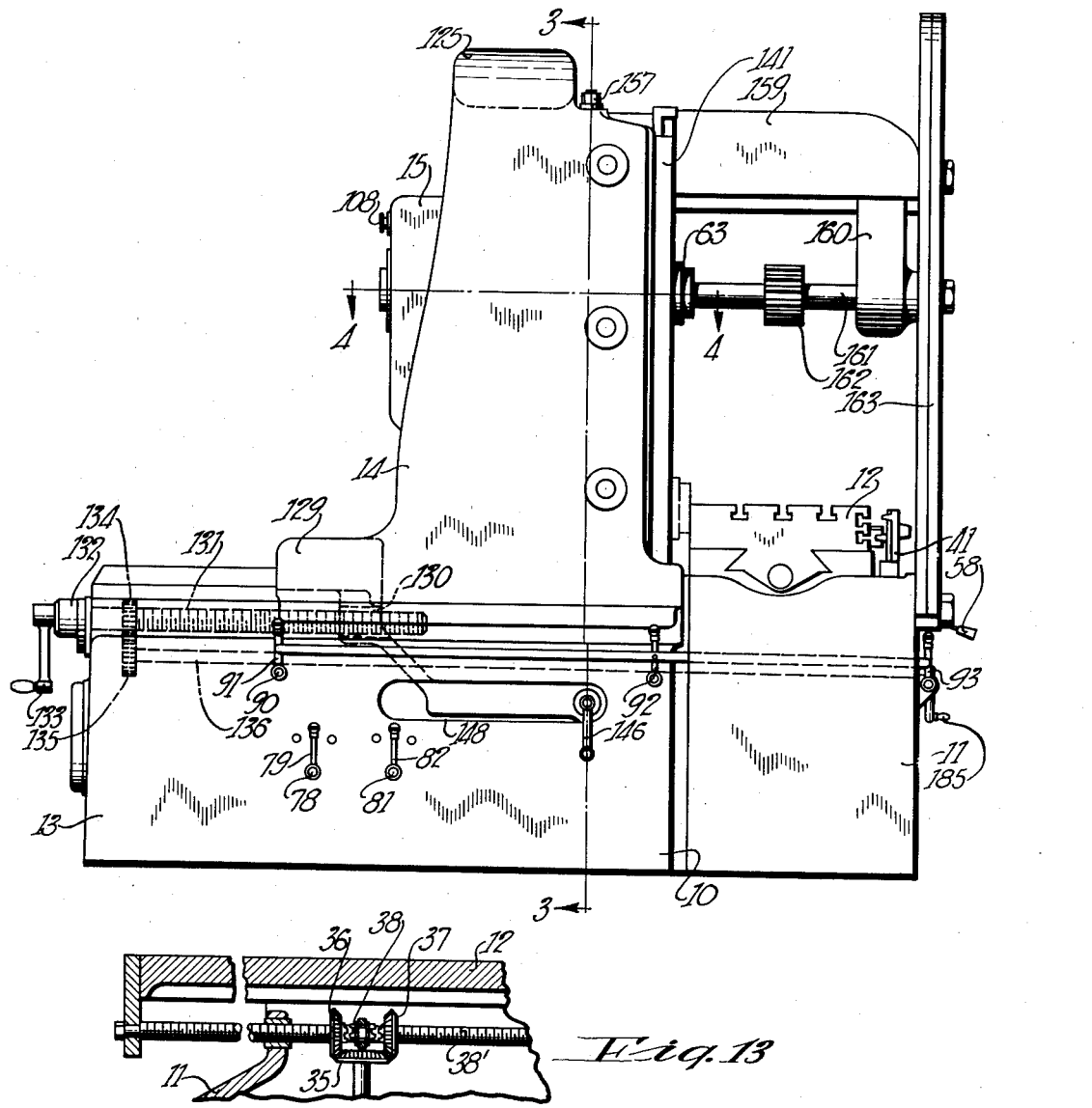
Inventor
LOUIS H. BLOOD
By  A.H. Parsons
Attorney Dec. 19, 1933.　　　　L. H. BLOOD　　　　1,940,443
MILLING MACHINE
Filed Jan. 15, 1931　　　　5 Sheets-Sheet 2
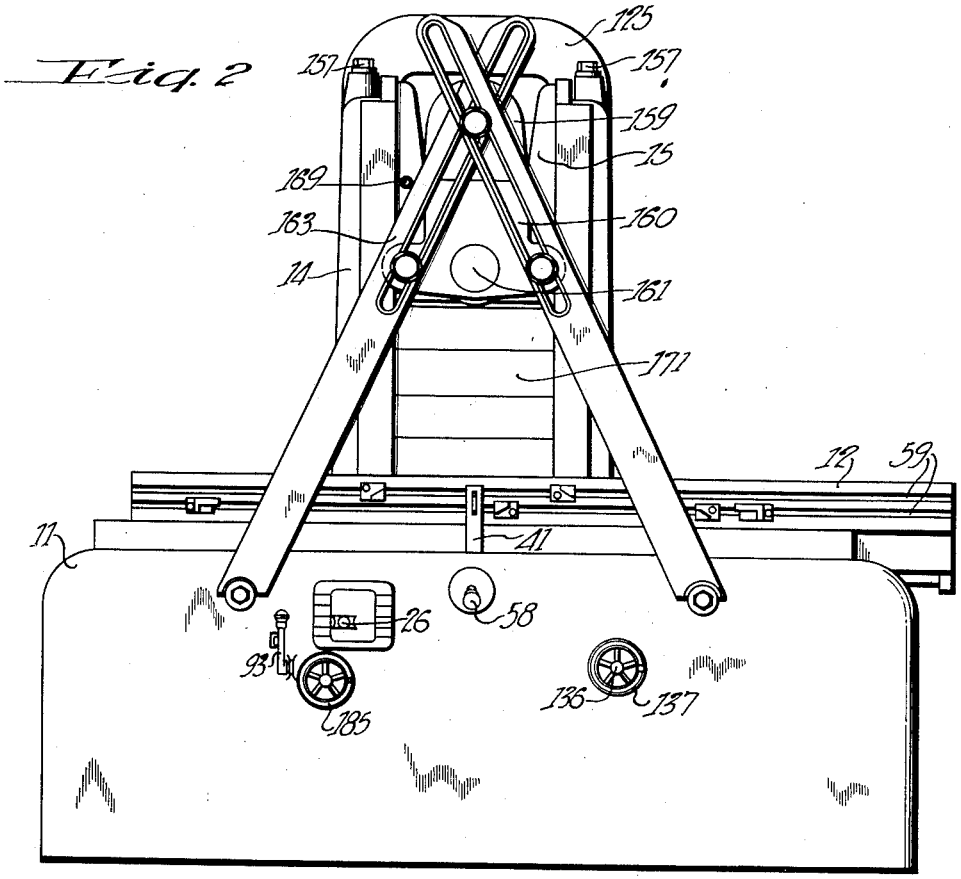
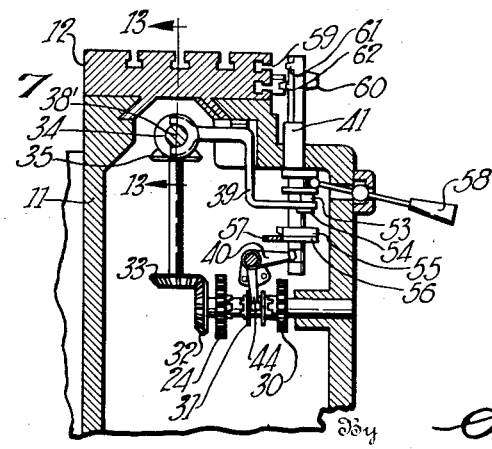
Inventor
LOUIS H. BLOOD
By H. K. Parsons
Attorney Dec. 19, 1933.    L. H. BLOOD    1,940,443
MILLING MACHINE
Filed Jan. 15, 1931        5 Sheets-Sheet 3

Inventor
LOUIS H. BLOOD
H. K. Parsons
Attorney

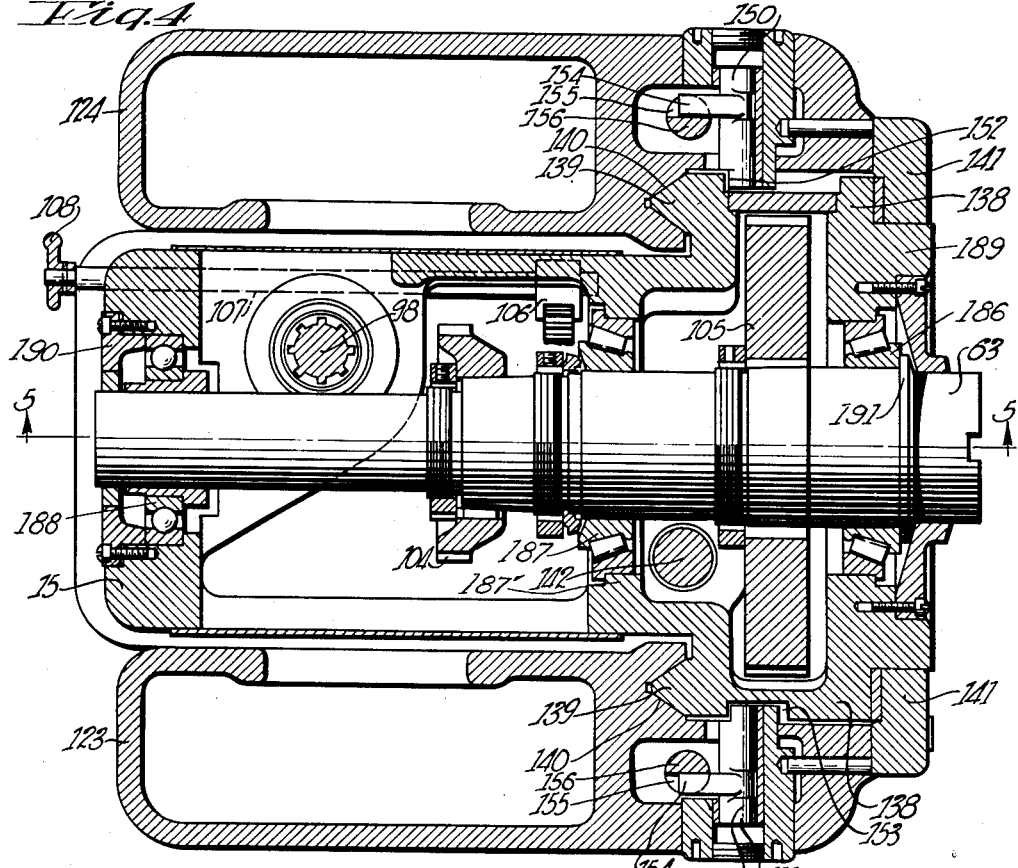

Dec. 19, 1933.  L. H. BLOOD  1,940,443
MILLING MACHINE
Filed Jan. 15, 1931   5 Sheets-Sheet 5
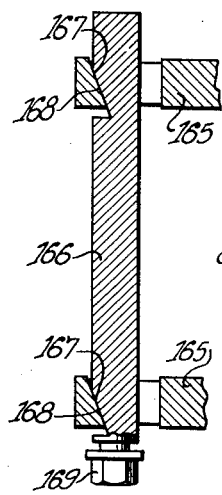
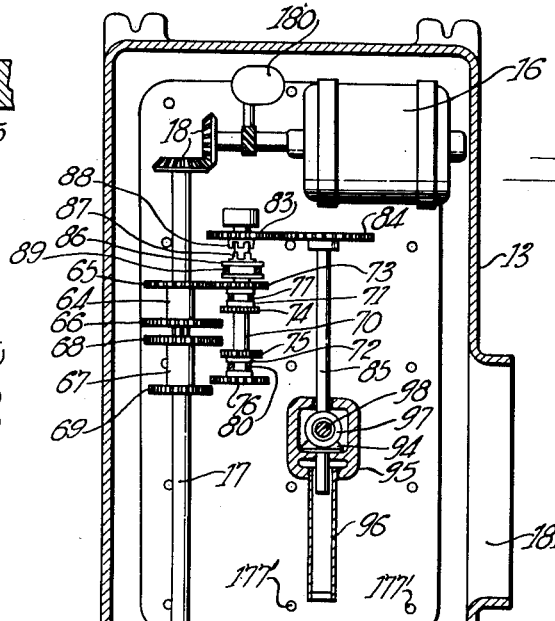
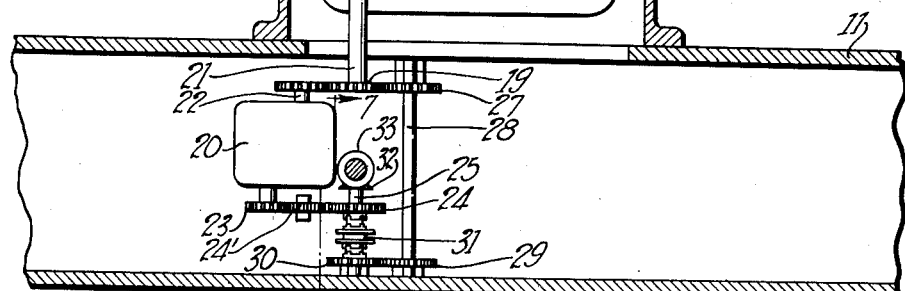
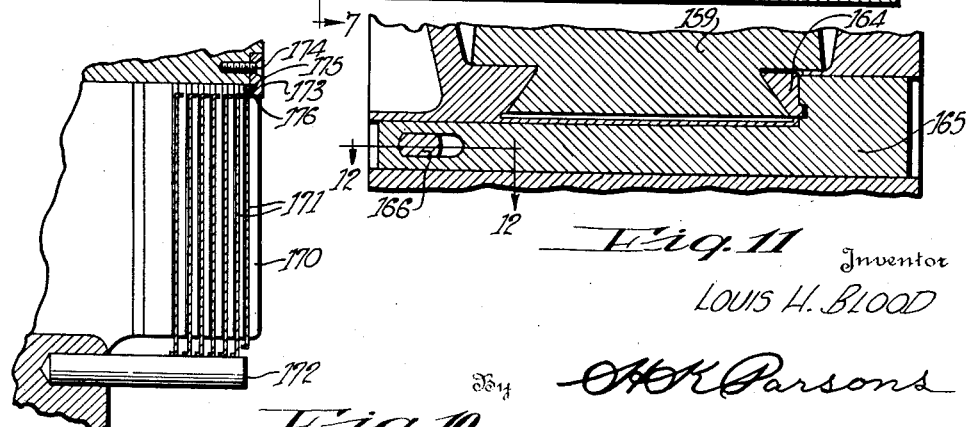
Inventor
LOUIS H. BLOOD
By AHParsons
Attorney Patented Dec. 19, 1933

1,940,443

UNITED STATES PATENT OFFICE 1,940,443

MILLING MACHINE

Louis H. Blood, Cincinnati, Ohio, assignor to The Cincinnati Milling Machine Company, Cincinnati, Ohio, a corporation of Ohio Application January 15, 1931. Serial No. 508,992

28 Claims. (Cl. 90—16)

This invention relates to milling machines and more particularly to a new and improved bed type milling machine.

One of the principal objects of this invention is to increase the range of adjustment and operation of a milling machine whereby the cubical work holding capacity of the machine may be increased, as well as its capacity for machining irregular shapes.

Another object of this invention is the provision of an improved bed type milling machine having a complete range of three-directional adjustment together with improved and simplified means for easily and quickly effecting any directional adjustment.

An additional object of this invention is to provide an improved milling machine having the combination of the easily and quickly effected three directional adjustment features of a knee and column type milling machine together with the solid work table supporting feature of a bed type machine resulting in a rugged and sturdy machine capable of machining large or heavy work pieces expeditiously and with facility.

Further objects of this invention are the provision of a new type of guideway construction, improved and simplified clamping mechanisms for adjustable parts and improved means for mounting and guiding a spindle carrier on its column to obtain rigidity of construction, narrow width in the column and suitable weight in the parts compatible with facility of adjustment.

Other objects and advantages of the present invention should be readily apparent by reference to the following specification considered in conjunction with the accompanying drawings illustrative of one embodiment thereof, but it will be understood that any modifications may be made in the specific structural details hereinafter disclosed, within the scope of the appended claims, without departing from or exceeding the spirit of the invention.

Referring to the drawings in which like reference numerals indicate like parts—

Figure 1 is a side elevation of a milling machine embodying the principles of this invention.

Figure 2 is a front view of the machine as viewed from the right of Figure 1.

Figure 3 is a sectional elevation of the machine as viewed on the line 3—3 of Figure 1.

Figure 4 is a section through the column and spindle carrier as viewed on the line 4—4 of Figure 1.

Figure 5 is a vertical section on the line 5—5 of Figure 4.

Figure 6 is a plan view of the transmission.

Figure 7 is a section on the line 7—7 of Figure 6.

Figure 8 is a detail of improved guideway construction.

Figure 9 is an enlarged view of the trip plunger detent mechanism.

Figure 10 is a detail of the chip guard.

Figure 11 is an enlarged view of the overarm clamping mechanism.

Figure 12 is a detail sectional view on line 12—12 of Figure 11.

Figure 13 is a detail view on line 13—13 of Figure 7.

In the drawings the reference numeral 10 indicates generally the base or support of the machine which is T-shaped in form, as more particularly shown in Figure 6. This base or support may be made integral or in sections, it being found preferable for the convenience of manufacture and assembly to make each leg a separate member. The base 10, therefore, comprises one leg in the form of the bed 11 upon which is reciprocably mounted a work carrying member, such as the table 12, and a second leg in the form of bed 13 upon which is reciprocably mounted a tool carrying organization. It will be noted from Figure 6 that the bed 13 is attached to the side of the bed 11 intermediate the length thereof, thus positioning the tool carrying member intermediate the length of the work carrying member whereby the work may be translated relative to the tool to effect a machining operation.

The tool carrying organization comprises generally a column member 14 reciprocably mounted on horizontal guides 111 formed on the bed 13 and in turn is provided with vertical guides 140 for receiving the vertically adjustable spindle carrier 15. From the general outline of the machine it will now be seen that a work support member has been provided which is reciprocably mounted upon a fixed support determining its line of action and that extending transversely therefrom are suitable guides for a column member movable toward and from the work support, the column member carrying a spindle carrier or tool holding member which is vertically adjustable upon the column and, therefore, vertically adjustable with respect to the line of action of the table. It should be observed that the cutter axis is movable in a vertical plane, as well as adjustable laterally of the work table in any position of vertical adjustment. This results in a machine having three-directional adjustment and the mechanism for obtaining or effecting these adjustments will now be described.

The table 12 mounted on the bed 11 is adapted to be reciprocated by a prime mover 16 located at the rear of the other bed 13. A main shaft 17 is journaled in the lower part of the bed 13 and driven from the prime mover through suitable means, such as the bevel gearing 18, this shaft extending through the wall of the bed 11 to actuate the feed and rapid traverse transmission for the table. A gear 19 secured to the end of the shaft 17 drives the variable speed transmission indicated generally by the reference numeral 20, through a gear 21 secured to the end of the driving shaft 22 of the variable feed transmission. This transmission may be of any suitable type, that shown and illustrated in the patent to Hazelton, Number 1,315,722, issued September 19, 1919 being found suitable for present purposes. As there illustrated this transmission termines in a final driven member, such as 23, which drives with the feed gear 24 mounted for free rotation on the shaft 25 through an intermediate idler 24'. This variable feed transmission may be provided with a suitable control lever 26 projecting through the front wall of the machine within easy reach of the operator for effecting changes in the rate of feed movement of the table.

The gear 19, previously referred to, meshes with a second gear 27 mounted on a shaft 28 parallel to the shaft 17 and journaled at opposite ends in the front and rear walls of the bed 11. Adjacent the front wall is a gear 29 keyed to the shaft 28 and in mesh with the rapid traverse gear 30 mounted for free rotation on the shaft 25. A clutch member 31 is slidably mounted on the shaft 25 intermediate the feed gear 24 and the rapid traverse gear 30 for selective engagement with either gear to effect actuation of the shaft 25 at feed or rapid traverse rates. A bevel gear 32 (Figure 7) is secured to the end of the shaft 25 and meshes with a second bevel gear 33 for driving a reverser 34 for the table. The reverser comprises the bevel gear 35 in constant driving engagement with the bevel gears 36 and 37 which are rotated in opposite directions and provided with clutch faces for selective engagement with the shiftable clutch member 38 keyed to the table lead screw 38'. The desired direction of movement of the table is effected by shifting the clutch member 38 into driving engagement with the proper gear while the rate of movement of the table is determined by the shiftable clutch member 31.

The clutches 31 and 38 are connected together for joint control by a single member 41 and for this purpose the clutch 38 is provided with a pivoted shifter fork 39 and the clutch 31 with a pivoted shifter fork in the form of a bell crank 40, shown more particularly in Figure 9. The control plunger 41 is reciprocably and rotatably mounted in the bed of the machine and these two directions of movement are utilized to effect control of either clutch without disturbing the other. The plunger 41 is provided with an indent 42 for receiving the rounded head 43 of the bell crank 40. A freely pivoted arm 43' has a forked end 44 engaging the rate control clutch 31. The bell crank is provided with detent mechanism comprising the pivoted latch member 45 having notches 46 and 47 for receiving the detent 48 integral with the bell crank 40. The arm 43' is mounted for free rotation on the pivot 49 to permit independent movement between the crank 40 and the arm 43'. The arm 50 of the bell crank has pins 51 and 52 mounted therein on opposite sides of the arm 43' but spaced a sufficient distance apart that upon rotation of the lever 40 the pins will not engage and move the member 44 until the detent 48 has approached the peak between the notches 46 and 47 thereby insuring that the clutch 31 will snap from one position to the other. From this construction it will be seen that movement of the plunger 41 upward will cause the clutch 31 to engage with the rapid traverse gear 30 and thereby effect movement of the table at a rapid traverse rate while movement of the plunger downward will effect engagement of the clutch with the feed gear 24 thereby causing movement of the table at a feed rate.

While the plunger is in either an upward or a downward position it may be oscillated to determine the direction of movement of the table either forward or return by means of a pair of cams 53 and 54 secured to the plunger and engaging a forked end of reverser shifter fork 39. The plunger is provided with a pair of notched plates 55 and 56 selectively movable into engagement with a pivoted detent 57. The arrangement is such that when the plunger is down the cam 53 engages the end of the shifter fork 39 while the notched plate 55 engages the detent 57. Since the plate 55 is provided with three notches the shifter fork 39 may be moved to a neutral position and detained there to stop movement of the table. When the plunger is moved upward the cam 54 engages in the forked end of the lever 39 and the notched plate 56 is in engagement with the detent 57. It will be noted that in this particular position of the parts there is lost motion between the cam 54 and the end of the lever 39 and also that the plate 56 is only provided with two notches thereby making it possible to shift the reversing lever direct from one extreme position to the other, similar to the arrangement for the rate clutch. The plunger 41 is adapted to be manually operated by the control lever 58 or it may be dog operated from suitable dogs mounted in the two T-slots 59 formed in the front edge of the table and for this purpose the plunger 41 is provided with a large wing 60 formed on one side thereof opposite to the table side and with a pair of projections 61 and 62 for effecting vertical movement of the plunger, all as more clearly explained and illustrated in our co-pending application Serial Number 431,909 filed February 27, 1930.

From the foregoing description it should now be apparent that the table 12 may be power translated upon its bed at any one of a number of feed rates or at a rapid traverse rate and in opposite directions and that its rate and direction may be controlled from a single member which is adapted for automatic or manual control.

The carrier 15 is provided with a series of anti-friction bearings 186, 187 and 188 for journaling the cutter spindle 63 therein which is adapted to be rotated from the prime mover 16 through a variable speed transmission, as illustrated in Figure 6. The thrust bearing 186 is mounted in the forward wall 189 of the carrier, the bearing 188 in the rear wall 190 of the carrier, and the thrust bearing 187 is mounted in the medial cross rib 187'. The spindle has a shoulder 191 engaging the inner race of bearing 186 and a threaded member thereon engaging the rear face of the inner race of bearing 187 thereby any looseness or wear in the bearings may be taken up or compensated therefor. The previously mentioned shaft 17 is provided with fixed gear couplets 64, comprising the gears 65 and 66, and 67 comprising the gears 68 and 69, these couplets being secured to the shaft for rotation therewith. A jack shaft 70 is journaled in the bed parallel to the shaft 17 and provided with a pair of shiftable gear couplets 71 and 72. The couplet 71 has gears 73 and 74 selectively movable into mesh with the gears 65 and 66 respectively, while the couplet 72 has gears 75 and 76 selectively movable into mesh with the gears 68 and 69 respectively. Each couplet is provided with an independent shifter, the couplet 71 having a shifter fork 77 secured to the end of the rotatable shaft 78 to the exterior end of which is secured the operating handle 79. The couplet 72 is provided with a shifter fork 80 secured to the end of the rotatable shaft 81 having attached to its outboard end the control level 82. By shifting either of these control levers from its neutral position it will be seen that any one of four different rates of rotation may be imparted to the shaft 70. This shaft has freely mounted thereon the gear 83 meshing with the gear 84 keyed to the end of the spline shaft 85. A starting clutch 86 is splined on the shaft 70 and is provided with a clutch face 87 for engaging the clutch face 88 of the gear 83. A shifter fork 89 pivotally mounted on the shaft 90 is adapted to be actuated by a control lever 91 mounted on the exterior wall of the machine for starting and stopping the spindle. To facilitate operation of the machine additional control levers have been provided for the starting clutch, as shown at 92 and 93, these levers being mounted upon opposite sides of the table 12 whereby the operator may control the rotation of the cutter from any of these positions.

The shaft 85 is splined in a bevel gear 94 mounted in anti-friction bearings in a housing 95 depending from the under side of the column. The gear 94 is fixed for movement with the column and is, therefore, slidable on the shaft 85. For the purpose of protecting the projecting end of the shaft and to satisfactorily prevent chips and other foreign material finding its way into the housing 95, a tubular member 96 secured to the housing surrounds the shaft 85 and is of sufficient length to completely enclose the shaft during the full range of movement of the column. Also mounted in the husing is a bevel gear 97 operatively engaging the gear 94 and secured to the end of a vertical spline shaft 98.

The shaft 98 is held by the gear 97 against longitudinal movement and extends upward into splined driving engagement with the hypoid gear 99 journaled in the carrier and movable vertically therewith. This gear meshes with a second hypoid gear 100 secured to the end of the cross shaft 101 which carries large back gear 102 and the small pinion gear 103 keyed for rotation therewith but longitudinally adjustable thereon for selective engagement with gear 104 fixed to the cutter spindle between the intermediate bearing 187 and the rear bearing 188, and gear 105 secured to the cutter spindle between the intermediate bearing 187 and the front bearing 186. The shifter fork 106 secured to the end of the shifter rod 107 which is slidably mounted in the carrier and provided with an exterior manual control 108, is utilized for shifting the gear couplet 102—103, movement to the left, as viewed in Figure 4, effecting interengagement of gears 102 and 104 for high speed while movement to the right to the position shown will effect engagement of gears 103 and 105 and cause rotation of the spindle at a low speed. The cutter spindle is thus actuated from the prime mover through a variable speed transmission located in the bed and provided with external controls thereon for effecting one series of progressive speeds while an additional control mounted on the carrier is effective to produce a second or higher series of progressive speed changes. By means of the spline shafts 85 and 98 the spindle is adapted to be driven in all positions of horizontal adjustment of the column and all vertical positions of adjustment of the spindle carrier.

The column 14 is mounted upon guide rails formed on the top of the parallel upstanding sides 109 and 110 of the bed 13. The guide rails 111 are formed of hardened steel and therefore, special means have been provided for securing them to the bed comprising a dove-tail groove 112 formed in the rail for securing them to the top of the bed side by engagement with the machined dove-tail shaped rib 114 integral with the bed side. The rails are secured in place or held against longitudinal movement by means of a plurality of round headed bolts, such as 115, which have one side shaped off, as illustrated at 116 for alignment with the inclined side of the dove-tail. These bolts extend through a hole 117 which is countersunk at both ends, the countersink 118 permitting the head of the bolt to be adjusted below the flat guide surface 119 while the other countersink 120 is provided for the nut 121 threaded on the end of bolt 115. This nut may be provided with a plurality of longitudinal slots 122 formed in the end thereof for receiving a spanner wrench or the like, whereby upon tightening of the nut the bolt 115 will be drawn downward engaging the inclined face 116 and securely wedging the guide 111 against the dove-tail rib 114. This construction makes it possible to provide hardened steel guideways which may be heat treated with little possibility of warping due to their uniform cross-section throughout.

The column 14 is composed mainly of two side portions or walls 123 and 124 which are integrally connected together at the bottom by the housing 95 and at the top by the cap member 125. From this construction it will be seen that a large rectangular opening is provided between the sides of the column, this opening extending down below the plane of the guides 111 and very much below the top surface of the table 12. This is very important as it permits the carrier 15 which is slidably mounted in this opening, to be moved or lowered to a position whereby the axis of the cutter spindle 63 is substantially below the level or plane of the table 12. Each of the sides 123 and 124 has formed in the bottom edge thereof a V shaped guide 126 of complementary shape to the guide rail 111 for reciprocation thereon; and for the purpose of preventing any tendency in the column to lift, gibs 127 are secured to the bottom of the column in engagement with the underside of the projecting tongue 128 formed on the bed. To minimize the frictional pressure per unit of area and to insure accurate guiding of the column each side 123 and 124 is provided with a longitudinal extension, as illustrated at 129, in Figure 1. Secured in one of these extensions, as more particularly illustrated in Figure 1, is a nut 130 for receiving the column adjusting screw 131 which is anti-frictionally journaled in the rear of the bed at 132 and held against longitudinal movement with respect thereto. The end of the screw is provided with a removable adjusting handle 133. To facilitate adjustment of the column, means have also been provided for controlling its movement from the front of the machine and to this end a gear 134 is secured, for rotation with the lead screw and in mesh with a similar gear 135 keyed on a shaft 136 which extends through the bed 13 and the bed 11 to the front of the machine where it is provided with a hand wheel 137. It will now be seen that the column may be longitudinally adjusted toward or away from the table 12 from an operating position at the front of the machine, as well as from the rear of the machine.

As more particularly illustrated in Figure 4, the spindle carrier 15 is provided with lateral extensions 138 on which are formed the V-shaped bearing surfaces 139 engaging the V-shaped guideways 140 formed in the vertical face of the side members 123 and 124. The carrier is held in engagement with these guides by gibs 141 secured to the column sides in engagement with the extensions 138.

The carrier is movable up and down by means of a lead screw 142 which is anti-frictionally mounted in an extension of the housing 95 and held therein against longitudinal movement. Keyed to the end of the lead screw and journaled in the housing is a bevel gear 143 meshing with the bevel gear 144 secured to the end of a horizontal shaft 145 having a detachable operating handle 146. The shaft 145 is journaled in a tubular housing 147 integral with the housing 95 and projecting therefrom through an elongated slot 148 formed in the wall of the bed 13. By this construction it is possible to vertically adjust the carrier in all positions of the column. It will be apparent that rotation of the handle 146 in one direction will effect elevation of the carrier while rotation in the opposite direction will lower the carrier. The elevating screw 142 is also adapted to be rotated from an operating position at the front of the machine and to this end the shaft 145 is provided with a spiral gear 182 meshing with a spiral gear 183 mounted in the housing 147 for movement therewith and having a splined connection with a longitudinal shaft 184 extending to the forward side of the bed 11 where it is provided with an operating handle 185. A tube 149, as shown in Figure 3, is provided for enclosing the screw 142 as it projects into the carrier upon lowering of the same thereby preventing the escape of oil from the interior of the carrier.

After the carrier has been vertically adjusted it is clamped into position by means of oscillatable cam members 150, shown more particularly in Figure 4. These members comprise a cylindrical portion 151 which is journaled in the column side and an eccentric portion 152 which projects into a groove 153 formed in the portion 138 of the carrier. Each cam member is provided with an operating finger 154 engaging a groove 155, shown more particularly in Figure 3, cut in the side of a vertically extending clamping bolt 156. It will be noted from Figure 3 that there are a plurality of these clamping members mounted in each side of the column and at vertically spaced distances which insure that irrespective of the vertical position of the carrier there will be means present to effect clamping thereof to the column. The bolts 156 extend to the top of the side members 123 and have threaded ends for receiving the clamping nuts 157. By tightening these nuts so as to exert an upward thrust on the bolts 156 the locking members 150 will thereby be rotated causing the eccentric portions 152 to exert an inward thrust on the V's 139 and thereby secure the carrier against movement.

The carrier is provided with another guideway 158 formed in the top side thereof for receiving a longitudinally adjustable overarm 159 which may be provided on the outboard end thereof with a pendant 160, as illustrated in Figure 1, for journaling the outboard end of cutter arbor 161 supporting a cutter 162. Suitable braces, such as 163, may be provided for securing the overarm 159 and cutter arbor 161 against lateral movement.

Attention is invited to the fact that while the overarm 159 is in position the carrier is prevented from being elevated to such a position as to leave the lead screw 142 by the cap member 125 which ties the column sides together. The overarm thus serves as a stop means to limit the upward movement of the carrier, but the overarm is of sufficient height that upon its removal the carrier may be run up to such a height as to leave the lead screw thereby making it possible to remove the carrier from the column.

The overarm 159 should be clamped against axial movement and to this end a loose guide and clamping gib 164 has been provided extending longitudinally thereof and adapted to be urged laterally into engagement with the overarm by a plurality of clamping members 165, Figure 11, spaced longitudinally of the strip and adapted to be simultaneously actuated by a clamping bolt 166 having beveled faces 167 engaging beveled face slots 168 formed in the members 165. A locking nut 169 is threaded to the end of the locking bolt 166 for simultaneously actuating all of the members 165 to clamp the overarm in its guideway.

A chip guard has been provided for preventing the accumulation of chips in the lower part of the rectangular opening of the column which might thereby interfere with the proper lowering of the spindle carrier. To this end opposed slotted blocks 170 are secured to the inner side of the column members 123 and 124 and a series of guard plates, such as 171, are mounted in these slots, one behind the other. Stop pins, such as 172, are provided adjacent the lower ends of the plates to keep them in place. A longitudinal strip 173 is secured to the lower edge of the carrier by suitable means, such as the screws 174, and this strip is provided with a longitudinal groove 175 on the interior face thereof for receiving the flanged edge 176 of the first or outer plate. The lower edge of this plate, as well as the others, is flanged rearwardly to engage the forward flanged top edge of the next succeeding plate. In this manner as the carrier moves up the first plate moves with it due to engagement of the flanged edge 176 with the slot 175, and subsequently the bottom flanged edge engages the top flanged edge of the next succeeding plate whereby each plate is successively engaged by the preceding plate for upward movement therewith. In this manner, irrespective of the height to which the carrier is moved the opening left by the removal of the carrier is protected from falling chips or the possibility of accumulation of chips therein.

The bed 13 is provided with a double bottom, as shown in Figure 3, and a chip screen, such as 177, is positioned on a ledge 178 formed around the periphery of the upper bottom member 179. This permits the chips to be gathered at an upper level while permitting the coolant to flow through holes 177' in the screen to a lower level and be re-pumped to the cutter by a circulating pump 180 located in the rear of the machine and adapted to be continuously actuated from the prime mover during operation thereof. An opening 181 is formed in the side wall of the bed 13, as shown in Figures 3 and 6, for the removal of chips and is of sufficient size that the chips may be readily shoveled out.

In connection with the construction of a machine of this type having an upstanding adjustable column it is highly desirable to maintain the relative dimensions within certain limits to avoid clumsy or bulky structures and thereby keep down the weight within suitable confines which is very necessary in translatable parts to permit ready and easy adjustment thereof. Attention is therefore, invited to the fact that the V-guides have been placed on the forward face of the column members 123 and 124 rather than on the adjacent side faces to maintain a narrow overall width in the column, and further that these guides are in a plane forward of the plane of the front face of the cap member 125, as more particularly shown in Figure 1, which permits the carrier to have its guides vertically extended forming horns 182' without interfering with the cap member when the carrier is elevated to its highest position. This positioning of the guides also makes it possible to widen the forward part of the carrier to encompass the large back gear 105 without increasing the width of the column while the width of the body portion of the carrier is maintained with narrow limits by the use of hypoid gears which permits the spline shaft 98 to be positioned laterally of the spindle sufficiently to pass the same as the carrier is lowered and also to provide a bearing above and below the drive gear 99 resulting in a very rigid and compact structure of narrow width. This construction also permits the ready assembly of the carrier with the column and its easy removal for inspection or repairs, as heretofore described.

It will be noted that the column has been provided with V-guides on both its vertical and horizontal faces which construction makes it possible to compactly clamp the carrier, column and bed together as a unit, without the tendency of spreading or the creation of lateral bending stresses in the long unsupported walls of the column and the bed. It is also important to note that the guides are positioned on the sides of the column about one-third of the distance up from the bottom, the lower part of the column being underslung between the horizontal guides to act as a stabilizer for the upper part which results in a substantially rigid and vibrationless support for the spindle carrier.

From the foregoing description it should now be apparent that a milling machine of the bed type has been constructed in which the relative adjustment between the tool and cutter may be readily and easily effected in three directions thereby retaining all the universality of action of a knee and column type milling machine while at the same time providing a solid support for the work and which is substantially independent of the tool support so far as the transmission of vibration thereto is concerned and which, by the removal of the overarm braces and the retraction of the column, is capable of receiving and operating on extremely large work pieces. It will also be noted that all of the controls have been suitably assembled at a single operating position at the front of the machine thereby simplifying its operation and control.

That which is claimed is:

1. A machine tool of the class described comprising a bed, guideways formed longitudinally thereof, a slide reciprocably mounted on said guides and having a portion depending between and below the plane of the guideways, means for translatably mounting a tool carrier on the slide, said means extending below the plane of said guideways, means in the depending portion for effecting said translation, an adjacent bed extending laterally of the first named bed, longitudinal guideways thereon for mounting a work supporting slide, and means for effecting relative movement of one slide with respect to the other to perform a tooling operation.

2. A machine tool of the class described comprising a work support, a spindle carrier, a column for supporting the carrier in cooperative relation to the work support comprising an upper portion having carrier guideways thereon, a lower portion having gearing for actuating the spindle and translating the carrier horizontal guides formed on the column substantially intermediate the two portions, a bed member having spaced upstanding parallel walls, means on the top of said walls receiving said guides for supporting the column therebetween, and means for effecting longitudinal adjustment of the column along the bed member.

3. A machine tool comprising a bed, spaced guideways formed on the bed, a column having supporting means projecting from the sides thereof engaging said guideways, a spindle carrier reciprocably mounted on the column, said column having a portion depending below the plane of said guides, and gearing mounted in said portion for effecting rotation of the spindle and translation of the carrier, said portion and gearing contained therein acting as a stabilizer for the upper portion of the column.

4. A milling machine having a bed, a work carrying slide reciprocably mounted thereon, a support intersecting the bed at right angles thereto and intermediate the length thereof, spaced longitudinal guideways formed on the support, a column member reciprocably mounted upon said guideways and having a portion depending between and extending below the plane of the guideways, a tool spindle rotatably supported by the column, means in the depending portion to adjust the spindle on the column, independent means for adjusting the column with respect to the work slide, and power actuated means for effecting translation of the work slide with respect to the tool spindle for effecting a machining operation.

5. A milling machine comprising a bed, a work table reciprocably mounted thereon, a second bed attached to the first bed intermediate its length and having spaced parallel guideways formed thereon normal to the first named guideways, a column member reciprocably mounted upon the last named guideways and having a portion depending below the plane thereof, a cutter spindle rotatably supported by the column, means in the depending portion to adjust the column toward and from the work table, additional means in said portion to adjust the cutter spindle toward and from the plane of the work table, and power means for effecting translation of the work table with respect to the cutter spindle.

6. A milling machine including a bed, guideways formed longitudinally thereof, a work table reciprocably mounted upon said spaced guideways, a second bed member, guideways formed thereon normal to the first named guideways, a column reciprocably mounted on the last named guideways, spaced vertical guideways formed upon the column, a spindle carrier mounted between said column guideways for reciprocation thereon, said vertical guideways extending below the plane of the table guideways whereby the axis of the spindle is movable to a position below the plane of the table.

7. A milling machine having a bed support, a work table on said support, spaced parallel guides formed on said support normal to the axis of the work table, a column member mounted on the bed guideways for reciprocation toward and from the table, said column member having spaced vertical guides extending between the guideways on the bed, and a spindle carrier reciprocably mounted on said vertical guides, said vertical guides extending below the plane of the bed guides whereby the spindle carrier may be moved to a position wherein its axis is below the plane of the table.

8. A milling machine comprising a bed having vertical side walls, guide rails formed on the top of said walls, a column member slidably mounted on the guide rails and having a portion depending between and below said rails, vertical guides formed on the column and extending above and below the plane of the guide rails, a carrier adjustably mounted on the vertical guides having a cutter spindle journaled therein, a table for supporting work in cooperative relation to the cutter spindle, and means to move the carrier to a position intermediate the guide rails to thereby position the axis of the cutter spindle below the plane of the work table.

9. A milling machine having a bed, a table reciprocably mounted thereon, a column member reciprocably mounted on the bed at right angles to the movement of the table, a carrier adjustably mounted on the column, a cutter spindle journaled in the carrier, a prime mover mounted in the bed, a transmission extending from the prime mover to the table for imparting movement thereto, a spline shaft journaled in the bed and extending parallel to the direction of column movement, change speed mechanism for actuation of said shaft by the prime mover, a second spline shaft vertically journaled in the column, motion transmitting means coupling the shafts for joint actuation, and change speed means actuated by the vertical spline shaft for imparting rotation to the cutter spindle.

10. A milling machine comprising a support, a table reciprocably mounted thereon, a column member slidably mounted on the support for movement toward and from the table, a cutter spindle journaled in the column, a prime mover branch transmissions extending from the prime mover to the table and to the spindle for actuation thereby, said spindle branch transmission including a speed change mechanism and a starting clutch in the order recited, control means mounted on the front of the support for determining the effect of the table transmission, and control means for the starting clutch including a control lever mounted on the front of the support, and an additional control lever mounted on the support adjacent to the column.

11. A milling machine comprising a bed support, a table reciprocably mounted thereon, said bed support having a pair of parallel vertical walls extending transversely of the table, guide rails formed on the top of said walls, a column member mounted on the rails for translation toward and from the table, a spindle carrier adjustably mounted on the column, carrier elevating means terminating in an actuator journaled in the lower end of the column below the column guide rails, one of said walls having an elongated slot for permitting access to the actuator in all positions of adjustment of the column, and means to clamp the carrier after adjustment.

12. A milling machine comprising a bed, a table reciprocably mounted thereon, a column member slidably mounted on the bed for adjustment toward and from the table, said column member comprising spaced parallel standards having guideways formed thereon, a spindle carrier mounted on said guideways between said standards, a cap member integral with the top of said members, a carrier elevating lead screw journaled in the column and operatively connected with the carrier, an overarm mounted on the carrier for supporting the outboard end of a cutter arbor, and for cooperating with the cap member to prevent separation of the carrier from its elevating screw, said overarm being removable to permit separation of the carrier from its lead screw.

13. In a machine tool having a fixed support and a movable support, guiding means on one of said supports for determining the direction of movement of the other comprising a dovetailed projection formed on one of said supports, a hardened steel rail having a dove-tailed groove for attachment to said projection, a guide surface formed on the rail for receiving and guiding the other of said supports, bevel faced locking members passed through the projection into engagement with the side of the groove, and means for exerting a longitudinal thrust on said members to wedge the rail into clamping engagement with the projection.

14. A machine tool having a vertical support comprising a pair of spaced side walls and an integral cap member, guides formed on forward faces of the side walls, a spindle carrier having an enlarged end portion, guide surfaces formed thereon for adjustment on the guides of the side walls, said carrier having a reduced portion extending between the side walls, a cutter spindle journaled in the carrier, means to drive the spindle in all adjustable positions of the carrier including a spline shaft journaled in the body portion of the carrier, another shaft journaled therein parallel to the spindle and driven by the spline shaft, and means thereon to rotate the spindle at a plurality of rates of speed.

15. A machine tool having a work support, a pair of spaced guides adjacent one side of said support, a cutter spindle carrier adjustably mounted on said guides for vertical movement relative to the work support, a transmission mechanism for the spindle on the side of the guides opposite to the table, a concatenated chip guard depending from the carrier between the table and the mechanism comprising a plurality of plates having oppositely extending top and bottom flanges, the top flange of one plate overlapping the bottom flange of the preceding plate.

16. A machine tool of the class described comprising a reciprocating work support, a column member, a cutter spindle, means in the column member to rotatably support the spindle in cooperative relation with the work support, including a bearing mounted in the front of the column adjacent the work support for supporting one end of the spindle, a rear bearing in the column supporting the opposite end of the spindle, an intermediate bearing in the column located in axial alignment between said front and rear bearings and engaging a middle portion of the spindle, said bearings being of the anti-friction type, driving means fixed to the spindle between the front and intermediate bearings, a second driving means fixed to the spindle between the intermediate and rear bearings, a prime mover, a power transmission actuated thereby, and means to selectively couple said driving means to the transmission in different ratios for actuation of the spindle by the prime mover at different speed rates.

17. A machine tool having a spindle support, a cutter spindle rotatably mounted in the support, a work table mounted for reciprocation transversely of the spindle, said support having a front bearing adjacent the work support and engaging a forward part of the spindle, a rear bearing in the support engaging the opposite end of said spindle, an intermediate bearing engaging an intermediate portion of the spindle, said bearings being of the anti-friction type, a drive gear secured to the spindle between said front and intermediate bearings, an additional drive gear secured to said spindle between the intermediate and rear bearings, said drive gears being of different sizes, individual power actuated gears selectively movable to engage the respective spindle gears, and shiftable means for determining which of said gears shall actuate the spindle and thereby its rate of rotation.

18. A milling machine having a bed, a work support reciprocably mounted upon the bed, a cutter spindle supported by the bed in cooperative relation to the work support, said supporting means comprising a front bearing, an intermediate bearing and a rear bearing, said bearings being of the anti-friction type, said front bearing being adjacent the work support and engaging a forward part of the spindle, said rear bearing engaging the opposite end of the spindle and said intermediate bearing supporting a medial portion of the spindle, a prime mover mounted in the bed, means coupling the prime mover to the spindle for actuation thereby including a high series and a low series transmission, said low series transmission including a gear secured to the spindle between the front and intermediate bearings, and a variable speed transmission in serial power transmitting relationship with the prime mover, said high series comprising a gear secured to the spindle between the intermediate and rear bearings and a variable speed transmission in serial power transmitting relationship with the prime mover, and means to selectively couple either of said gears for actuation by the prime mover to thereby select the series of speeds at which the spindle is to be rotated.

19. A milling machine having a bed, a work support reciprocably mounted upon the bed, a cutter spindle supported by the bed in cooperative relation to the work support, the spindle supporting means comprising a front bearing, an intermediate bearing and a rear bearing, said bearings being of the anti-friction type, said front bearing being adjacent the work support and engaging a forward part of the spindle, said rear bearing engaging the opposite end of the spindle and said intermediate bearing supporting a medial portion of the spindle, a prime mover mounted in the bed, means coupling the prime mover to the spindle for actuation thereby including a high series and a low series transmission, said low series transmission including a gear secured to the spindle between the front and intermediate bearings, and a variable speed transmission in serial power transmitting relationship with the prime mover, said second series comprising a gear secured to the spindle between the intermediate and rear bearings and a variable speed transmission in serial power transmitting relationship with the prime mover, means to selectively couple either of said gears for actuation by the prime mover to select the series of speeds at which the spindle is to be rotated, and a speed change mechanism for varying the rate of either series.

20. A milling machine having a cutter spindle, a work support, means to support the spindle in cooperative relation to the work support including a forward bearing, an intermediate bearing and a rear bearing, said forward bearing being located adjacent the work support, means to rotate the spindle at high speeds including a gear attached to the spindle between the intermediate and rear bearings, a prime mover mounted in the machine at right angles to the axis of the cutter spindle, a variable speed transmission actuated by the prime mover, clutch means for selectively coupling the gear with its variable speed transmission, an additional gear secured to the spindle between the intermediate bearing and the forward bearing, and means driven by said prime mover for selectively actuating said additional gear to impart a low series of speeds to the spindle.

21. A milling machine comprising a bed support, a table reciprocably mounted thereon, said bed support having a pair of parallel vertical walls extending transversely of the table, guide rails formed on the top of said walls, a column member mounted on the rails for translation toward and from the table, a spindle carrier adjustably mounted on the column, carrier elevating means compising a lead screw anti-frictionally mounted in the lower portion of the column, one of said side walls having an elongated slot therein, a bearing sleeve projecting from said lower portion through said slot, a shaft journaled in said sleeve and coupled to the lead screw for effecting actuation thereof, manual operating means on the exterior end of said shaft for adjusting the carrier from a position at one side of the table, a second shaft journaled in the bed support normal to the first shaft, motion transmitting means coupling the shafts for joint operation, and means on the opposite side of said table for actuating the second shaft whereby the carrier may be adjusted from an operating position on either side of the table.

22. A machine tool having a support, a work table slidably mounted thereon, a spindle carrier mounted in cooperative relation to the work table, a prime mover, a main shaft continuously operated by the prime mover, change speed gearing actuated by the main shaft, a spindle transmission, a clutch for coupling the speed change gearing with the spindle transmission, said main shaft terminating in a drive gear, a pair of pinions meshing therewith, a feed transmission actuated by one of said pinions, a rapid traverse transmission actuated by the other pinion, a table feed screw clutch mechanism for connecting the screw to either transmission, automatic trip actuated control devices for said mechanism, and manual means for selectively operating said clutch mechanism.

23. A milling machine having a column comprising spaced vertical side walls, a vertical guideway formed in each wall, a spindle carrier reciprocably mounted between said walls on said guide ways, a work support mounted for reciprocation transversely of the carrier movement, means to adjust the carrier relative to the work supporting means to clamp the carrier after adjustment comprising actuating rods reciprocably mounted in each side wall and extending substantially the full length thereof, oscillatable cam members spaced longitudinally of each guide journaled in the said walls, each member having an eccentric portion engageable with the carrier to force the same into frictional contact with its guide, means coupling all of the cam members in one wall to the rod therein for joint actuation, and means on the top of the column to effect axial movement of the rods and thereby clamping and unclamping of the carrier to its guideway.

24. A machine tool of the class described comprising a bed, guideways formed longitudinally thereof, a slide reciprocably mounted on said guides and having a portion depending between and below the plane of said guideways, a spindle carrier reciprocably mounted on the slide for joint movement therewith in one direction and for independent movement with respect to the slide in a second direction, means carried by the slide for effecting reciprocation of the carrier, said means extending below the plane of said guideways and supported by said depending portion, manually operable means projecting beyond the side of the bed below the plane of said guideways for actuating the carrier reciprocating means, an adjacent bed extending laterally of the first named bed having guideways formed thereon, a work support mounted on said last named guideways, and means for effecting relative movement between the work support and the slide to perform a tooling operation.

25. A machine tool comprising a bed, spaced guideways formed on the bed, a column having supporting means projecting from the sides thereof engaging said guideways, a spindle carrier having a spindle journaled therein reciprocably mounted on the column, said column having a portion depending below the plane of said guides, a housing formed in said portion, a first pair of bevel gears mounted in said housing one of which is connected to the spindle, power means to actuate the other bevel gear to effect rotation of the spindle, a second pair of bevel gears mounted in the housing, one of which is connected to the spindle carrier to effect reciprocation thereof, and the other is connected to manual operating means, said housing and the gearing contained therein acting as a stabilizer for the upper portion of the column.

26. In a milling machine having a cutter spindle and a work support, a column having means therein for supporting the spindle in cooperative relation to the work support including a forward bearing, an intermediate bearing and a rear bearing, said forward bearing being located adjacent the work support, means to rotate the spindle at high speed including a gear attached to the spindle between the intermediate and rear bearings, a drive shaft extending transversely of the spindle, means coupling said gear to the driving shaft, an electric motor mounted in the machine with its axis extending at right angles to the plane of the cutter spindle axis, transmission extending from the motor to said drive shaft including a variable speed mechanism and a clutch in the order recited, manually operable means for operating said clutch, an additional gear secured to the spindle between the intermediate bearing and forward bearing, and mechanism actuated by the electric motor for rotating said gear selectively at a series of low speeds.

27. In a machine tool the combination with a hollow housing having a front and rear wall, a cutter spindle supported by said housing and a work support mounted adjacent said front wall for movement at various feed rates in accordance with the depth of cut, of a first bearing mounted in the front wall for supporting the forward end of said spindle, a second bearing mounted in the rear wall for supporting the opposite end of the spindle, a third bearing formed in said housing intermediate the front and rear walls for supporting a middle portion of the spindle, means for rotating the spindle at high speeds when taking light cuts including an electric motor having its axis extending transversely to the axis of the spindle, a change speed mechanism and a clutch operatively connected in the order recited to the prime mover, a drive shaft extending transversely of the spindle, clutch operating means for selectively coupling the drive shaft to the change speed mechanism, a relatively small high speed gear secured to the spindle between the intermediate and rear bearings, a drive train operatively connecting said gear to the transverse drive shaft, additional means for rotating said spindle at slow speeds when taking heavy cuts including a relatively large gear secured to the spindle between said front and intermediate bearings, and means for selectively coupling said large gear to the prime mover for rotation thereby.

28. In a milling machine having a cutter spindle and a work support, a column having means therein for supporting the spindle in co-operative relation to the work support including a forward bearing, an intermediate bearing and a rear bearing, said forward bearing being located adjacent the work support, means for rotating the spindle at a series of relatively high speeds including a gear attached to the spindle between the intermediate and rear bearings, a drive shaft extending transversely of the spindle, means coupling said gear to the drive shaft, an electric motor mounted in the machine with its axis extending at right angles to the plane of the cutter spindle axis, a transmission extending from the motor to said drive shaft including a shiftable gear variable speed mechanism, means for shifting said gears, a shiftable member for selectively coupling said mechanism to said drive shaft, an additional gear secured to the spindle between the intermediate bearing and forward bearing, and mechanism actuated by the electric motor for rotating said additional gear selectively at a series of low speeds.

LOUIS H. BLOOD.